US010967896B2

(12) United States Patent
Kravchenko (10) Patent No.: US 10,967,896 B2
(45) Date of Patent: Apr. 6, 2021

(54) STACKABLE ROLLING COOLER BINS WITH DRAWERS

(71) Applicant: Alina Kravchenko, Houston, TX (US)

(72) Inventor: Alina Kravchenko, Houston, TX (US)

( * ) Notice: Subject to any disclaimer, the term of this patent is extended or adjusted under 35 U.S.C. 154(b) by 560 days.

(21) Appl. No.: 15/865,576

(22) Filed: Jan. 9, 2018

(65) Prior Publication Data
US 2018/0127007 A1 May 10, 2018

Related U.S. Application Data

(60) Provisional application No. 62/446,082, filed on Jan. 13, 2017.

(51) Int. Cl.
*B62B 1/26* (2006.01)
*F25D 3/06* (2006.01)
(Continued)

(52) U.S. Cl.
CPC .............. *B62B 1/006* (2013.01); *B62B 1/04* (2013.01); *B62B 1/14* (2013.01); *B62B 1/26* (2013.01); *B62B 5/0083* (2013.01); *B62B 5/067* (2013.01); *F25D 3/06* (2013.01); *F25D 3/08* (2013.01); *B62B 2203/40* (2013.01);
(Continued)

(58) Field of Classification Search
CPC ......... B62B 5/0083; B62B 1/26; B62B 1/006; F25D 3/06; F25D 3/08; F25D 25/025; F25D 2303/08221
See application file for complete search history.

(56) References Cited

U.S. PATENT DOCUMENTS 2,246,342 A * 6/1941 Brown ................. F25D 25/025
62/266
4,724,681 A * 2/1988 Bartholomew .......... F25D 3/06
190/18 A
(Continued)

FOREIGN PATENT DOCUMENTS

EP      2284466 A1 *  2/2011 ........... F25D 25/025
KR   20180005968 A  *  1/2018
(Continued)

OTHER PUBLICATIONS

Igloo Ice Cube Roller Cooler: https://www.amazon.com/Igloo-Roller-Cooler-60-Quart-Ocean/dp/B002VQ9PU2.
(Continued)

*Primary Examiner* — Steve Clemmons
(74) *Attorney, Agent, or Firm* — Scot Fagerland (57) ABSTRACT

This invention is directed to a kit of coolers that offers a number of improvements over the prior art. The coolers are modified to specifically accommodate frozen gel ice packs instead of ice cubes. Because there is no spill water, the coolers open with front-facing pull-out drawers. The coolers stack atop one another with interlocking parts. Easy transport is provided by a handle and wheels, which may be attached to the bottom (main) bin or alternatively on a separate dolly. Internally, the cooler bins are compartmentalized horizontally or vertically with dividers. Hollow spaces within the walls and dividers of the bins accommodate frozen gel ice packs. Overall, the coolers are easier to pack and unpack, stack, load into a car, and transport on the ground than conventional ice chest coolers.

6 Claims, 11 Drawing Sheets

(51) Int. Cl.
  *B62B 1/00* (2006.01)
  *B62B 1/04* (2006.01)
  *B62B 5/06* (2006.01)
  *F25D 3/08* (2006.01)
  *B62B 5/00* (2006.01)
  *B62B 1/14* (2006.01)

(52) U.S. Cl.
  CPC ....... *B62B 2204/04* (2013.01); *B62B 2204/06* (2013.01); *F25D 2400/16* (2013.01); *F25D 2400/38* (2013.01)

(56) References Cited

U.S. PATENT DOCUMENTS

| | | | | |
|---|---|---|---|---|
| 4,832,509 A * | 5/1989 | Merrifield | A47B 88/40 384/21 |
| 5,100,198 A * | 3/1992 | Baltzell | A47C 7/74 280/30 |
| 5,240,264 A * | 8/1993 | Williams | B62B 3/006 211/194 |
| 5,421,172 A * | 6/1995 | Jones | F25D 3/08 62/457.5 |
| 5,435,642 A * | 7/1995 | Kennedy | A47B 83/045 297/188.11 |
| 5,605,056 A * | 2/1997 | Brown | A01K 97/04 62/457.4 |
| 5,660,476 A * | 8/1997 | DeCoster | A45C 11/20 190/108 |
| 5,816,433 A * | 10/1998 | Higgins | A45C 11/20 220/534 |
| 5,890,613 A * | 4/1999 | Williams | A45C 7/0045 220/23.4 |
| 6,053,345 A * | 4/2000 | Jones | B65D 21/0231 215/398 |
| 6,925,834 B2 | 8/2005 | Fuchs | |
| 6,983,946 B2 * | 1/2006 | Sullivan | B62B 1/002 206/511 |
| 7,128,369 B2 * | 10/2006 | Boggs | A47C 1/14 297/188.08 |
| 7,677,580 B2 * | 3/2010 | Vanderberg | B62B 3/022 280/47.18 |
| 7,891,493 B2 * | 2/2011 | Dege | A45C 11/20 206/545 |
| 8,567,211 B2 * | 10/2013 | Al-Rasheed | F25D 3/08 62/388 |
| 8,657,307 B2 * | 2/2014 | Lifshitz | B25H 3/02 280/47.18 |
| 9,101,212 B2 * | 8/2015 | De Roeck | A47B 87/0284 |
| D741,920 S * | 10/2015 | Seiders | D15/90 |
| 9,643,629 B2 * | 5/2017 | Bar-Erez | A47B 81/00 |
| 9,718,608 B2 * | 8/2017 | Tattam | B65D 81/3834 |
| 9,726,415 B1 * | 8/2017 | Spalti | A45C 11/20 |
| 9,738,296 B2 * | 8/2017 | McBeth | B62B 1/22 |
| 9,834,360 B2 * | 12/2017 | Tanaka | F25D 3/08 |
| 9,920,977 B1 * | 3/2018 | Avila | F25D 3/06 |
| 10,065,848 B2 * | 9/2018 | Volin | B67D 1/0004 |
| 10,139,153 B2 * | 11/2018 | Furr | F25D 23/025 |
| 10,473,390 B2 * | 11/2019 | McCurry | F25D 31/005 |
| 2003/0122460 A1 * | 7/2003 | Chang | A47B 88/49 312/334.46 |
| 2006/0038367 A9 * | 2/2006 | Ferraro | A47B 87/0284 280/47.35 |
| 2006/0076379 A1 * | 4/2006 | Hussaini | F25D 31/005 224/275 |
| 2006/0288730 A1 * | 12/2006 | Shill | F25D 3/08 62/457.2 |
| 2007/0044502 A1 * | 3/2007 | Hase | B65B 69/0008 62/371 |
| 2007/0137245 A1 * | 6/2007 | Ward | F25D 3/06 62/457.7 |
| 2010/0052276 A1 * | 3/2010 | Brunner | B25H 3/027 280/47.35 |
| 2010/0327562 A1 * | 12/2010 | Kasuya | A45C 5/14 280/651 |
| 2011/0220531 A1 * | 9/2011 | Meether | F25D 3/08 206/508 |
| 2013/0146498 A1 * | 6/2013 | Chen | B65D 21/0209 206/509 |
| 2013/0193673 A1 * | 8/2013 | Vanderberg | B62B 5/067 280/655 |
| 2016/0187046 A1 * | 6/2016 | Chen | A45C 11/20 62/239 |
| 2016/0245576 A1 * | 8/2016 | Harral | A45C 13/02 |
| 2016/0258665 A1 * | 9/2016 | Kiedaisch | F25D 3/08 |
| 2016/0370082 A1 * | 12/2016 | Olivo | F25D 3/06 |
| 2017/0115045 A1 * | 4/2017 | Aiken | F25D 3/06 |
| 2017/0305596 A1 * | 10/2017 | Dag | B65D 5/503 |
| 2018/0161975 A1 * | 6/2018 | Brunner | A45F 3/10 |
| 2019/0002004 A1 * | 1/2019 | Brunner | B62B 5/067 |

FOREIGN PATENT DOCUMENTS

| | | | |
|---|---|---|---|
| WO | WO-9717582 A1 * | 5/1997 | F25D 3/08 |
| WO | WO-0021830 A1 * | 4/2000 | F25D 3/06 |
| WO | WO-2014124479 A1 * | 8/2014 | A45C 5/065 |

OTHER PUBLICATIONS

Coleman Xtreme 4: https://www.dickssportinggoods.com/p/coleman-xtreme-4-40-quart-rolling-cooler-16colu40qtwhldxtrodrxx--1/16colu40qtwhldxtrodrxx.

Gott Marine Cooler: web.archive.org/web/20180706111653/https://www.rubbermaid.com/en-US/150-qt-gott™-marine-cooler.

Coleman Party Stackable Cooler: https://www.4imprint.com/product/105525/Coleman-25-Quart-Party-Stacker-Cooler.

Iceberg Cooler: http://icebergcoolerco.com/aboutus/stackability.html.

Alfresco Under Counter Insulated Ice Drawer: https://www.bbqislandinc.com/alfresco-26-inch-under-counter-insulated-ice-drawer.html.

* cited by examiner fig. 1 fig. 2 fig. 3 fig. 4 fig. 5 fig. 6 fig. 7 fig. 7a fig. 8 fig. 9 fig. 10 fig. 11 fig. 12 fig. 13 fig. 14 fig. 15 fig. 17 fig. 16 fig. 18 fig. 19 fig. 20 fig. 21 fig. 22 fig. 23 fig. 24 fig. 25 fig. 26 fig. 27 fig. 28

STACKABLE ROLLING COOLER BINS WITH DRAWERS

1. FIELD OF THE INVENTION

This invention is in the field of refrigeration, specifically cooled enclosures.

2. BACKGROUND OF THE INVENTION

A cooler is a great way to keep food and drinks cold when on the go. However, coolers fashioned on the ages-old "ice chest" model have a number of inconvenient features. I have invented a cooler that is ergonomically designed for maximal portability, access, and sanitation.

3. DESCRIPTION OF RELATED TECHNOLOGY

The conventional cooler is a carry-over of the ice chest. A chest is filled with ice, and food and beverages are merely positioned in or on the ice. The chest opens from the top so that melting ice does not spill out. The space inside a cooler is usually undivided.

There are now many more practical cooling agents than simple ice cubes. Cold packs are very popular because they are reusable and they don't spill. Coolers that use cold packs do not have to abide by the design limitations of conventional ice chests.

Keeping food and drinks in an ice chest cooler is impractical in a number of ways. It is difficult to search for a specific food or beverage item. It is difficult to sort foods according to temperature and fragility. If there are items on top of the cooler, the user is forced to remove those items in order to open the cooler. Ice is heavy, and the melt water must eventually be drained. This makes it difficult to lift and maneuver the cooler. Many coolers are too large for small vehicular spaces, especially in cars that are fully packed. It is also very difficult to access the contents of a cooler while driving a car.

4. SUMMARY OF THE INVENTION

The present invention addresses all of the design problems mentioned above. It is a kit of coolers that includes one or more bins. The bins are fashioned after drawers, not chests. That is, each bin opens with a pull-out drawer from the front.

The main bin includes wheels and an extendable pull-handle for easy rolling. It is much easier to roll a cooler around than to carry it everywhere.

The invention also includes various sizes of modular bins with drawers that pull out from the front. Each modular bin has indentations on top and protrusions on bottom. These bins stack and fit on top of each other like pieces of a puzzle: the protrusions on the bottom of one modular bin fit securely into the indentations of another modular bin. In the preferred embodiment, one or more modular bins stack on top of a main bin. The modular bins can alternatively be stacked on top of a separate dolly with an extendable handle and wheels (without a main bin).

Each drawer seals airtight when shut, and is locked by a locking mechanism. A latch releases the locking mechanism that keeps each drawer secure in the bin.

The separate stackable bins allow the user to organize food items into specific categories of fragility and temperature. Dividers fit inside each drawer. These dividers and the drawer walls include pocket sections, which can accommodate jelly ice packs. This allows the user to keep various food items at different temperatures. These dividers really come in handy when shopping at the farmers' market, ensuring that eggs and bread don't get squashed beneath the watermelon! They also help organize food and beverages into types, with an area for labels on the front of each drawer. In addition, it will help save time for people going on the hunt for their favorite beverage.

The bins' drawers allow the user to place items such as a bag or drink on top of the cooler without worrying about removing it in order to get inside. In addition, the top of the cooler has indentations for the bottom of other bins to fit into like a puzzle. These top indentations can be used as drink holders, with a storage area in between for sandwiches or additional ice packs.

Another incredible solution that the invention provides is a mess-free and money-saving way to keep the contents of the cooler cold and dry, because of the reusable ice packs that slide into the separate compartments inside each wall of the cooler. The jelly material inside of each ice pack prevents condensation and keeps the items inside cold and dry. When they melt, their contents stay contained in the bags and can be placed in a freezer to reuse again. As mentioned above, inside each drawer there are hollow dividers. The user can place additional sections in these dividers, with or without ice packs, preventing items from shifting and keeping the items in the middle cold as well. The ice packs can be placed in a way that covers every side of the contents, with ice packs on the top, bottom, left, front, top, and bottom if needed.

The other great thing about the invention is that each drawer section is small enough to be lifted much more easily than a large bulky ice chest cooler, because of the modular bins that can be lifted one piece at a time. Each bin (including the main bin) has side handles toward the top, on the left and right sides of the bin, allowing the user to grip each bin and lift it up easily. This makes loading and unloading a car, for example, very easy. Each bin has grooves in the rear face, which fit securely into the extendable handles of either the main bin or the dolly. A small or weak person may choose to buy a dolly or a main bin with a smaller compartment and several smaller bins.

This cooler configuration is ideal for travel by car. The modular bins are small enough to fit easily into a small trunk, even with other items there. Because the drawers open from the front, it is easy to access food items inside, even if the bins are in the trunk. In addition, the small modular bins allow the user to bring one particular bin (perhaps a small one packed with sandwiches, chips, and soda water for the road) with her inside the back seat of her car.

The "Stackable Rolling Cooler Bins with Drawers" kit includes: (1) A main bin, which includes an extendable handle and wheels with a drawer; (2) Modular bins, which can be stacked on top of one another in interlocking fashion like a puzzle, and which can also be stacked on top of the main bin or on the dolly; (3) A dolly with wheels and an extendable handle, to be used with the modular bins; (4) Customized polypropylene grocery tote bags that can fit inside each bin, in various sizes to fit each bin and each section of the bins.

6. DETAILED DESCRIPTION OF THE PREFERRED EMBODIMENTS

FIGS. 1-10 depict a first embodiment of the invention. This embodiment includes a main bin 11 (FIGS. 1-4). The main bin has a main bin drawer 111, at least two wheels 112, and an extendable handle 113. Note that the drawer pulls out from the front. It does not lift up from the top. The front-opening, pull-out drawer is one of the most important features of this invention. It provides easy access to the contents of the cooler even when cooler units are stacked atop one another.

Figure 1:
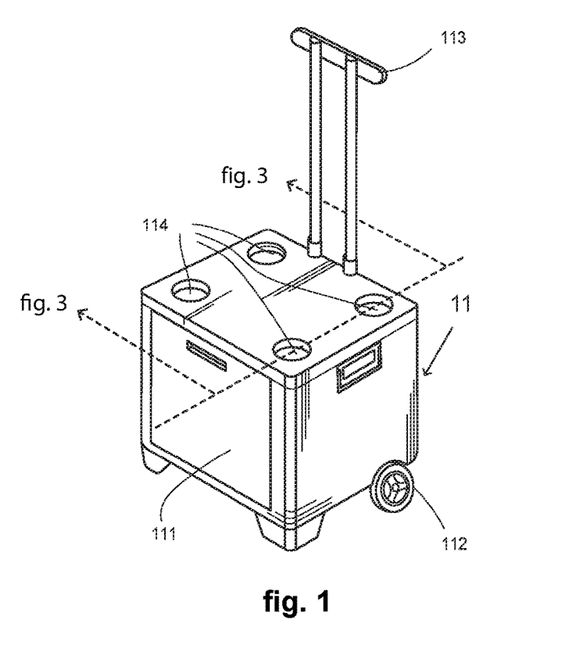
FIG. 1 shows the main bin with the drawer closed and the handle in extended position. This view shows the front-opening drawer, one of the wheels, a side handle, and the indentations on the top face of the main bin, which can be used as cup holders but are also used to accommodate the protrusions from a modular bin.
Figure 2:
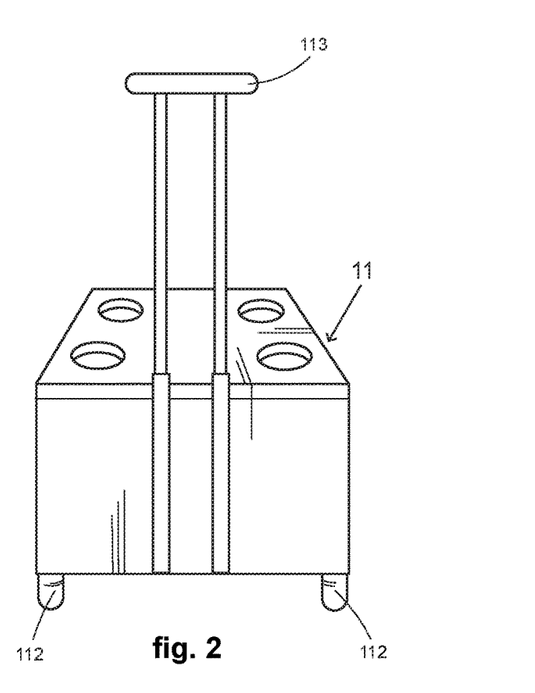
FIG. 2 is a back view of the main bin, showing how the extendable handle is attached.
Figure 3:
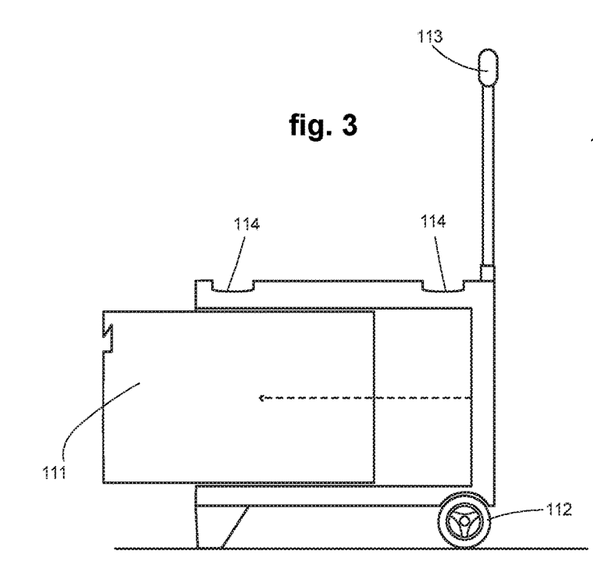
FIG. 3 is a cross-sectional view of the main bin, showing the drawer inside. The dashed arrow depicts the direction of motion of the drawer.
Figure 4:
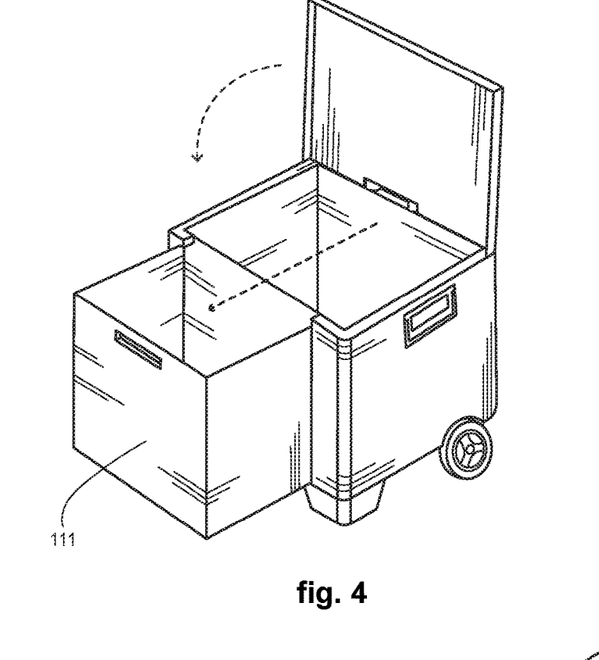
FIG. 4 shows the main bin with the drawer open and the handle collapsed. The straight dashed arrow depicts the direction of motion of the drawer. The arced dashed arrow shows the direction of motion of the top lid.
Figure 5:
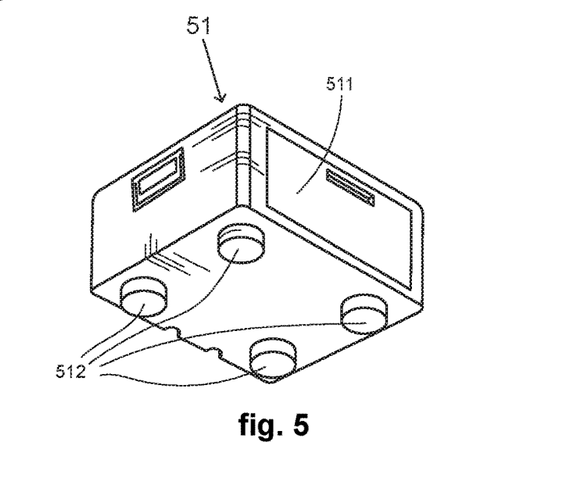
FIG. 5 is a first perspective view of a modular bin, showing the front-opening drawer, a side handle, and the protrusions on the bottom.
Figure 6:
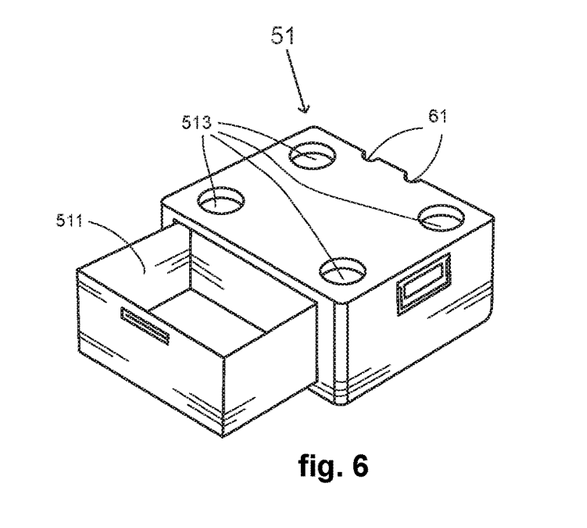
FIG. 6 is a second perspective view of a modular bin, with the drawer open. This view illustrates the indentations on the top surface of the bin.
Figures 7, 7A, 8, 9:
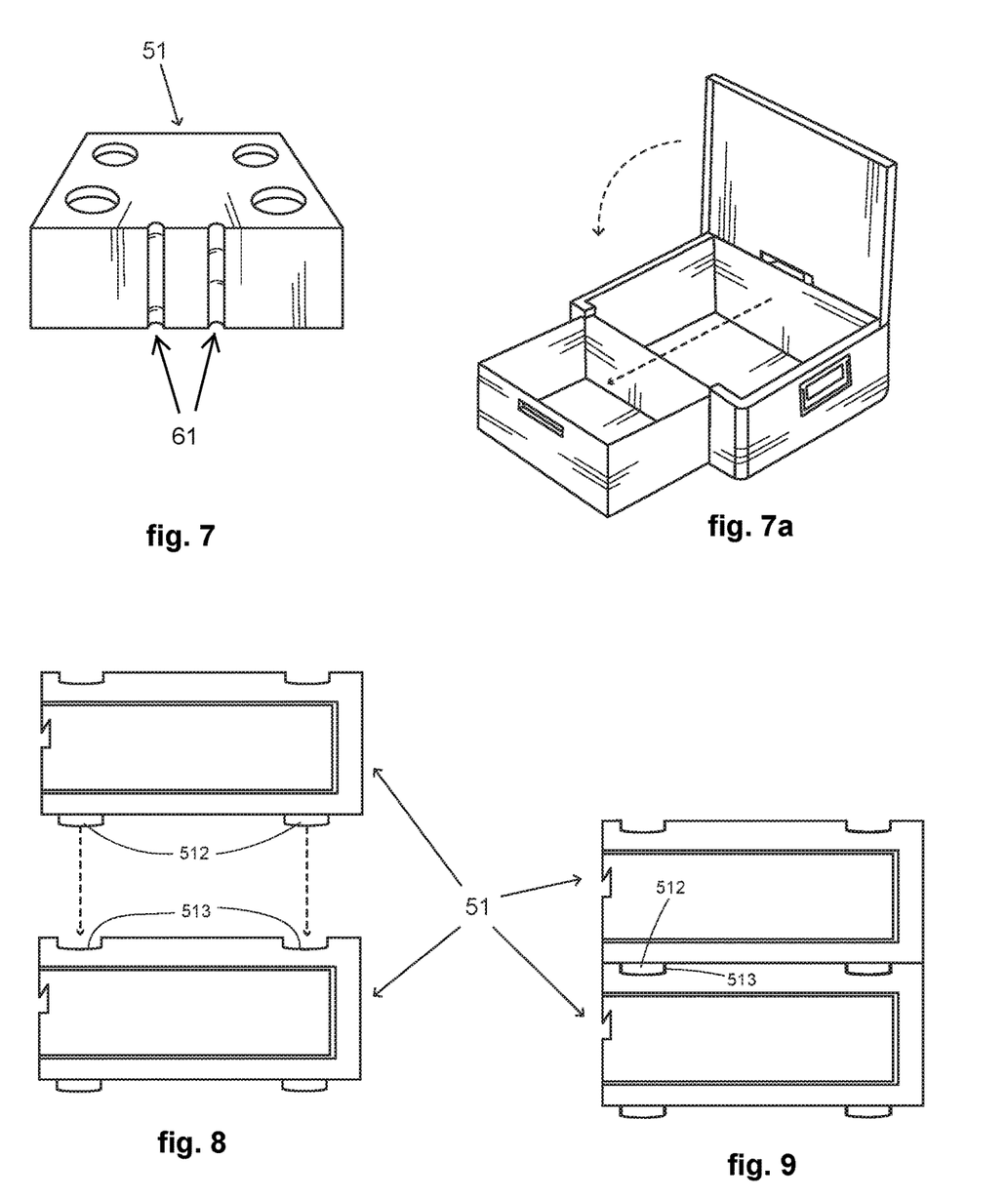
FIG. 7 is a third perspective view of a modular bin, showing the grooves on the rear face.
FIG. 7a is a fourth perspective view of a modular bin, this time with the top lid open. The straight dashed arrow depicts the direction of motion of the drawer. The arced dashed arrow shows the direction of motion of the top lid.
FIG. 8 is a first right plan cross-sectional view of two modular bins, showing the drawers inside. In this figure, one bin is being lowered toward another one. The dashed arrows illustrate how the protrusions in the upper bin will fit into the indentations of the lower bin.
FIG. 9 is a second right plan cross-sectional of two modular bins. In this figure, one bin is securely in position on top of another one, with the protrusions of the upper bin locked in place in the indentations of the lower bin.

The first embodiment of the invention includes one or more modular bins 51, as introduced in FIGS. 5-9. These bins are called "modular" because each bin is a self-contained module, and the bins are designed to function together as a kit. Each modular bin, like the main bin, has a modular bin drawer 511. The modular bins fit into one another for easy stacking. Each modular bin has protrusions 512 on its bottom surface. Each modular bin has indentations 513 on its top surface. When one bin is placed on top of another one, the protrusions of the bin on top fit into the indentations on the bin on bottom. This keeps the bins securely locked into place, as shown in FIGS. 8 and 9. Note that the main bin 11 also has main bin indentations 114 so that a modular bin can fit into place atop the main bin. See FIGS. 1, 3, and 10. Each modular bin may also include a male seat belt clip at one or both rear bottom corners (not shown), so that it can be transported securely in the backseat of a car. In the best envisioned mode, these seat belt clips are detachable from the cooler, so that they may be purchased separately and attached to the bin only when needed for car transport.

Figure 13:
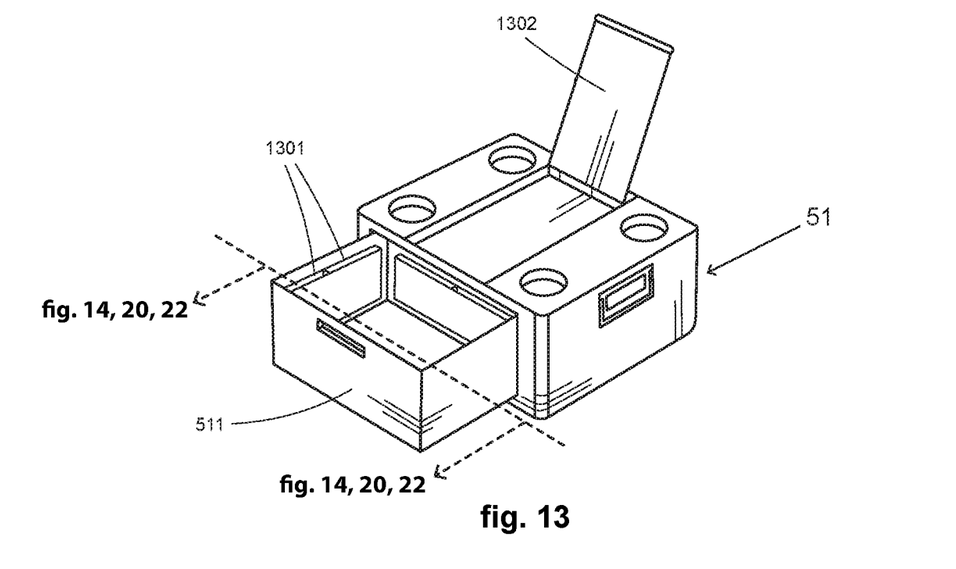
FIG. 13 shows a modular bin with space for ice packs. This figure shows a top flap open to reveal a space for ice packs. It also shows hollow space in the walls of the drawer, where ice packs can be stowed.

FIG. 13 depicts a modular bin with a top-opening trapdoor 1302. This opens to a shallow indentation within the lid, which may be used to store sandwiches or jelly icepacks.

Figure 10:
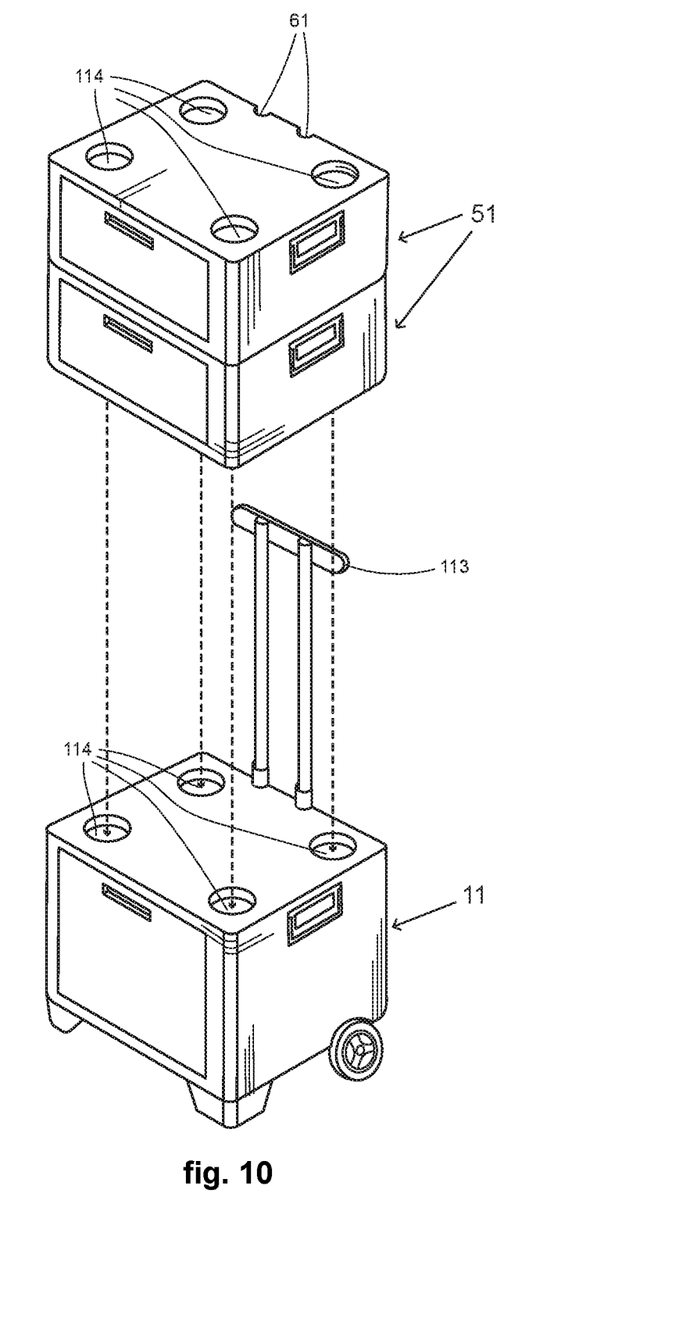
FIG. 10 shows two modular bins being lowered into position atop the main bin. The dashed arrows illustrate how the protrusions of the lower modular bin will fit into the indentations atop the main bin.

In FIGS. 6, 7, and 10, two vertical grooves 61 are visible in the back of a modular bin. When the modular bins are stacked atop the main bin, the extendable handle 113 fits securely within the vertical grooves 61.

Figure 11:
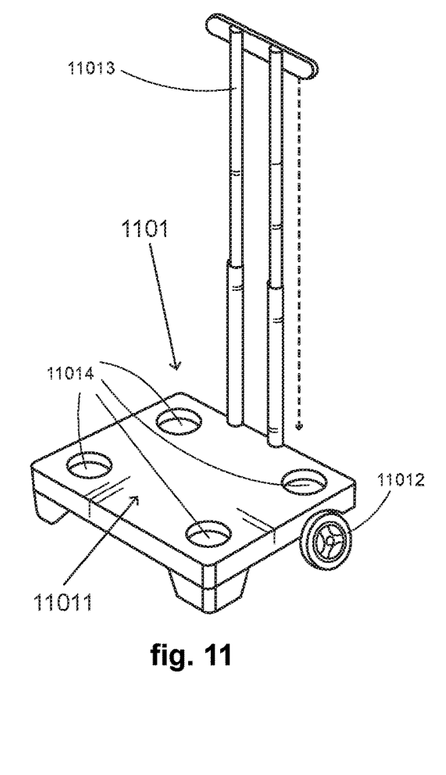
FIG. 11 illustrates a dolly. The dolly does not have a main bin. It has wheels, an extendable handle, and protrusions to accommodate the protrusions of a modular bin.
Figure 12:
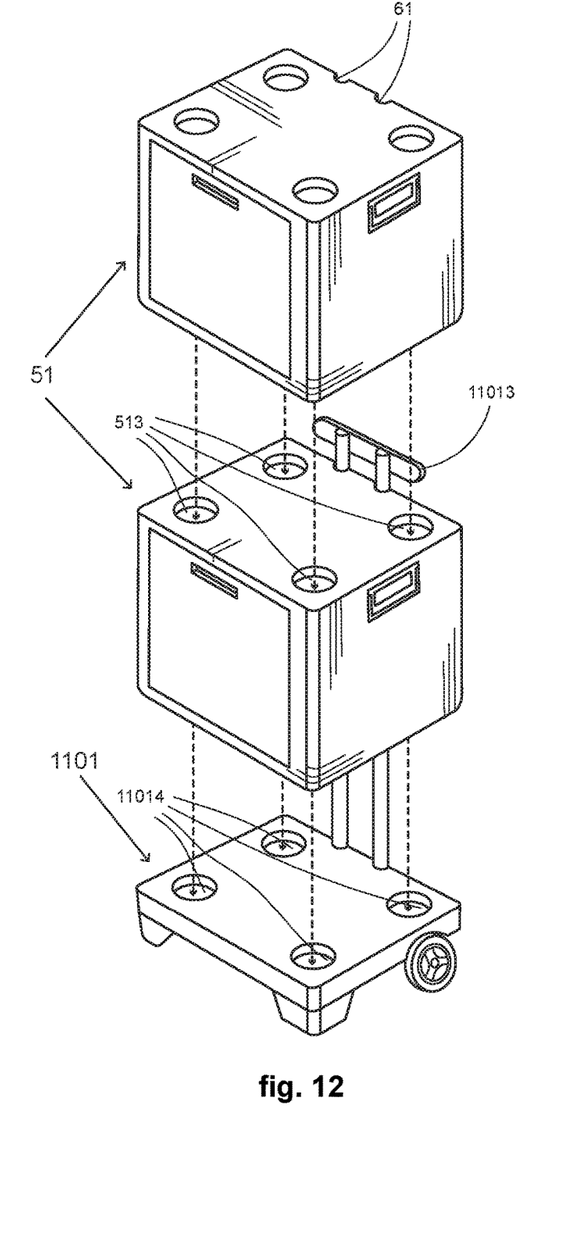
FIG. 12 shows two modular bins in position and ready to stack atop the dolly. This figure shows how the extendable handle fits into the grooves of the modular bins. The dashed arrows show how the protrusions of each modular bin will fit into the indentations beneath it.

FIGS. 11-12 show a second embodiment of the invention. In this embodiment, a dolly 1101 includes a platform 11011, at least two dolly wheels 11012, a dolly handle 11013, and dolly indentations 11014. The dolly is not permanently affixed to any bin. Instead, one or more modular bins 51 are stacked atop the platform as needed. In FIG. 12, the bin protrusions 512 are not visible, but it is understood that they fit into the bin indentations 513 and the dolly indentations 11014. The vertical grooves 61 are visible in FIG. 12. When the modular bins 51 are stacked atop the platform 11011, the dolly handle 11013 fits securely within the vertical grooves 61.

When a drawer is closed, whether it be the main bin drawer 111 or a modular bin drawer 511, a locking mechanism keeps the drawer securely closed and airtight. A push of the handle releases the locking mechanism so that the drawer can be opened again.

Figure 14:
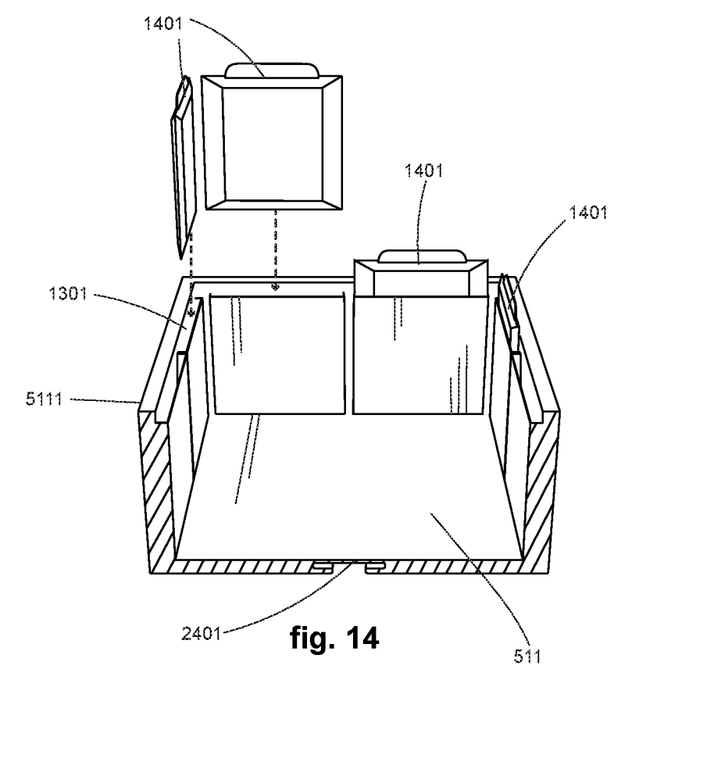
FIG. 14 shows ice packs being positioned into the hollow walls of a drawer.

Each drawer, whether it be the main bin drawer 111 or a modular bin drawer 511, has hollow walls. FIGS. 13 and 14 demonstrate this feature on a modular bin 51. It is understood that the main bin 11 has similar features. In these figures, the modular bin drawer 511 has drawer pocket sections 1301. The drawer pocket sections are hollow spaces within the interior walls of the drawer. The hollow spaces are used to hold jelly icepacks 1401. The drawer pocket section is composed of a thin or conducting material facing inward toward the drawer, so that heat from the contents of the drawer may be drawn into the jelly icepacks.

Figure 15:
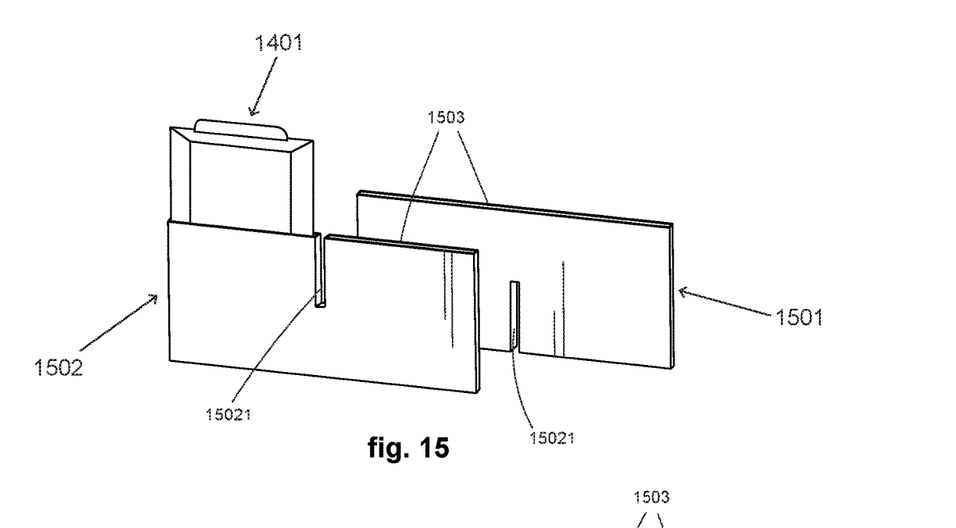
FIG. 15 shows two vertical drawer dividers, with an ice pack being inserted into the hollow recess of one divider. The figure shows a slot in each divider.
Figure 16:
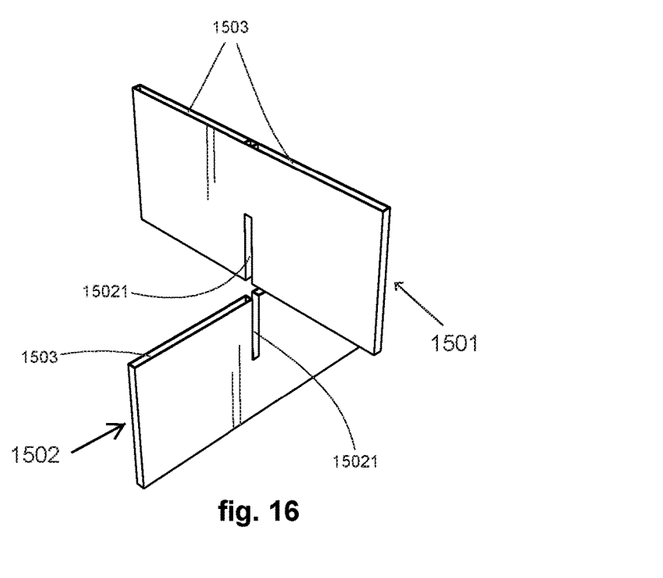
FIG. 16 shows two vertical dividers about to be fit together, with divider grooves aligned.
Figure 17:
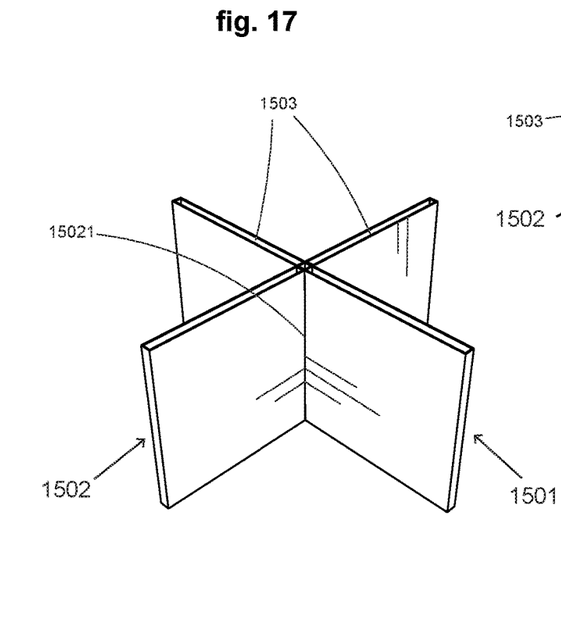
FIG. 17 shows two vertical dividers after they have been fit together. Each divider is now secured within the groove of the other divider.

The bins allow the user to organize food items into specific categories according to levels of fragility and preferred temperature. Each drawer includes dividers. In one embodiment, the dividers are vertical, as introduced in FIGS. 15-17. FIGS. 15-17 depict one upper divider 1501 and one lower divider 1502. Each divider includes a divider groove 15021. The upper divider is placed into position on top of the lower divider, and perpendicular to the lower divider, so that the divider grooves fit securely into one another.

Figure 18:
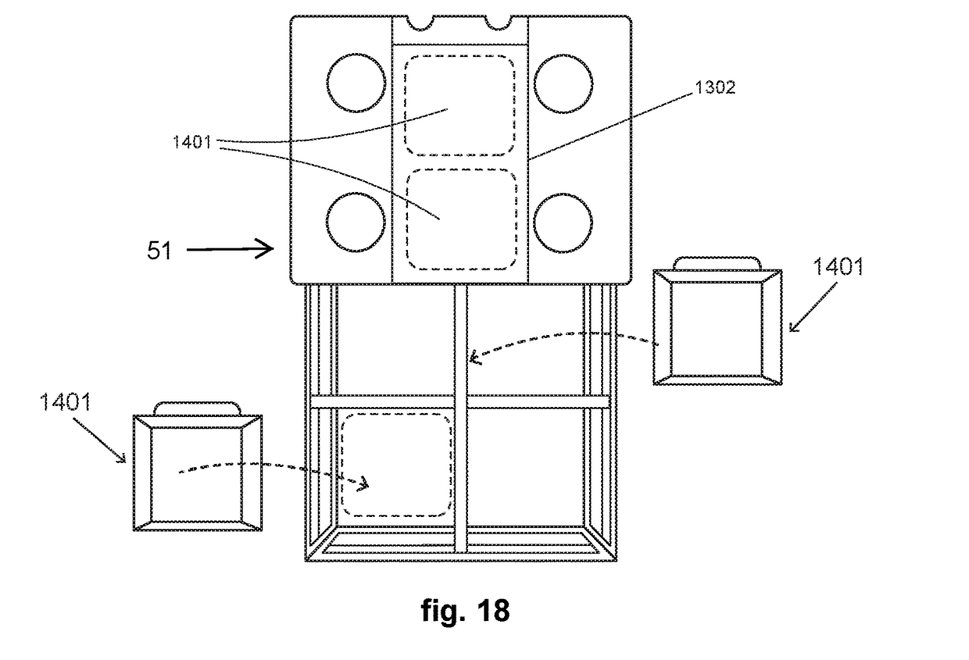
FIG. 18 is a top plan view of a modular bin. The figure shows one ice pack being positioned at the bottom of the drawer and another ice pack being positioned within the hollow recess of a divider. The dashed arrows represent the placement of the ice packs. The dashed rectangles represent ice packs, some of which are hidden beneath the top flap.
Figure 19:
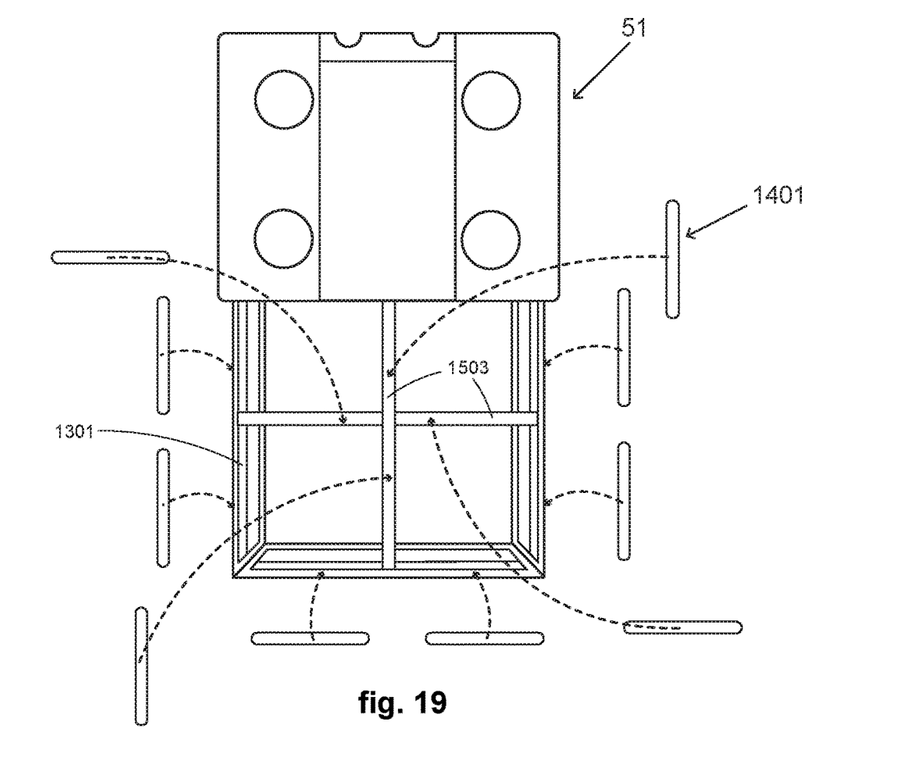
FIG. 19 is a second top plan view of a modular bin. This figure shows several ice packs being positioned in the hollow recesses of dividers and the walls of the drawer.

Each vertical divider is hollow. The divider pocket section 1503 is a hollow space where jelly icepacks can be inserted. FIG. 15 shows a jelly icepack 1401 being placed into a divider pocket section 1503. Each divider is composed of a thin or conducting material, so that heat from the contents of the drawer may be drawn easily into the jelly icepacks. FIGS. 18 and 19 show how many various places where jelly icepacks may be positioned within a modular bin 51—within the drawer pocket sections 1301, the divider pocket sections 1503, and the trapdoor 1302, as well as the bottom of the drawer itself.

Figures 26, 27, 28:
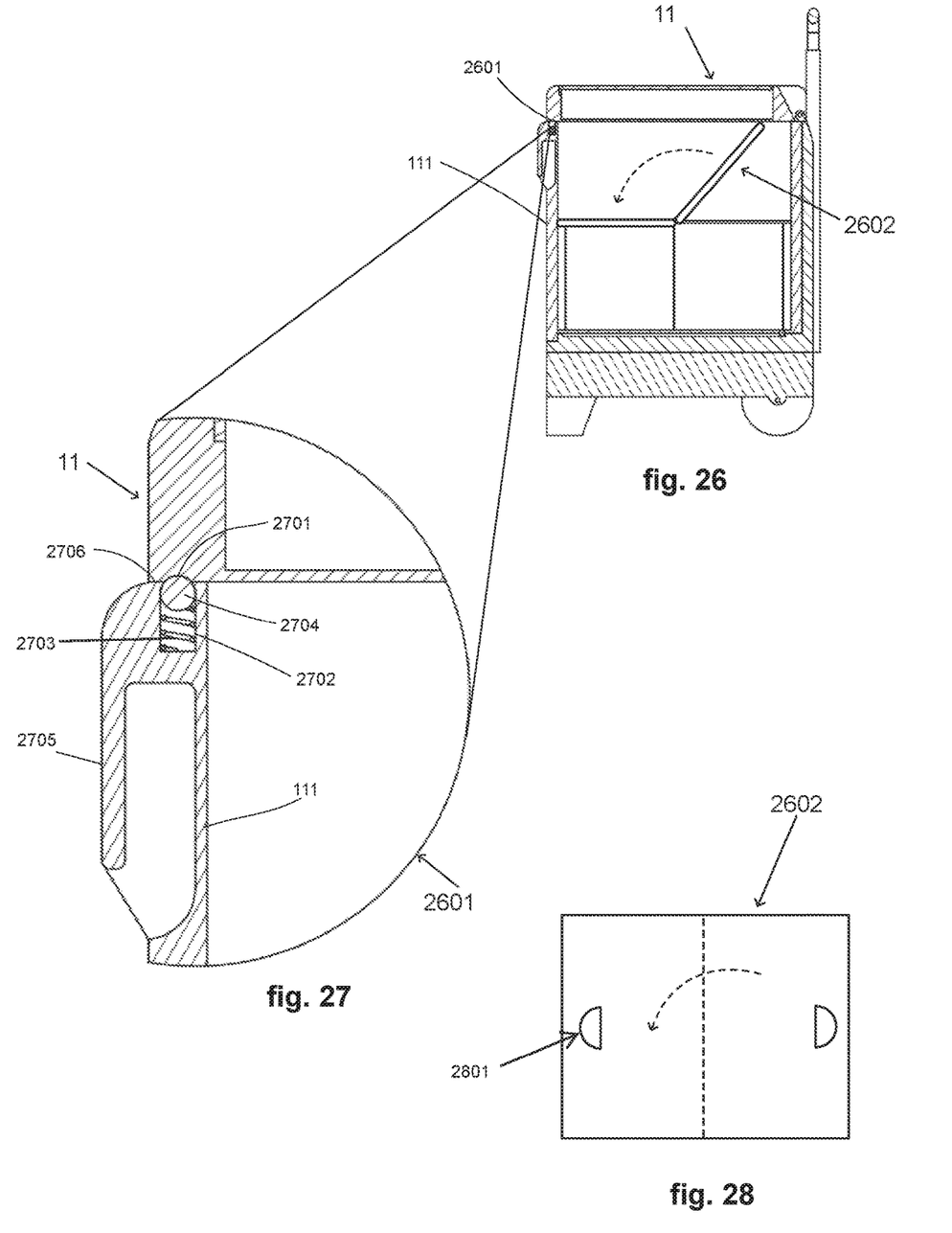
FIG. 26 is a cutaway left-plan view of the main bin. The curved dashed arrow shows the direction of motion of the horizontal divider.
FIG. 27 is a detail from FIG. 26, showing the locking mechanism for a drawer.
FIG. 28 is an upper plan view of a horizontal bin divider. The straight dashed line is a fold in the divider. The dashed arrow shows the direction of motion of the divider as half of it is folded over the other half.

In another embodiment, the bin dividers are horizontal. FIGS. 26 and 28 show a bin with a horizontal divider 2602. This feature allows the separation of heavy items from light or fragile ones, even within the same bin, so that the heavier items do not squish the lighter ones. Half of the horizontal divider folds over the other half to provide access to the lower half of the bin. Handles 2801 facilitate lifting or opening the horizontal divider.

Figure 20:
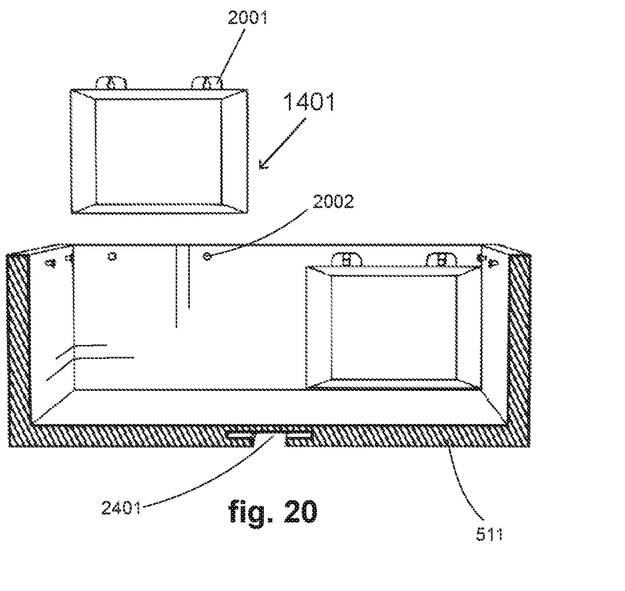
FIG. 20 shows a bin drawer with jelly ice packs held in place by a system of loops and rivets.
Figure 21:
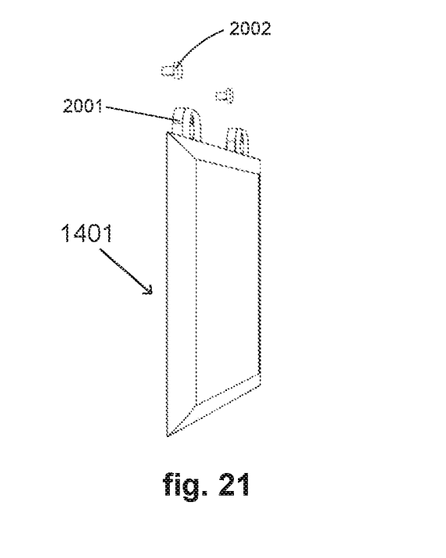
FIG. 21 shows the loops and rivets from FIG. 20 in greater detail.

An alternate means of securing jelly ice packs in drawers is a system of loops and hangers. Two embodiments of this system are shown in FIGS. 20-23. FIG. 20 shows the interior of a modular bin drawer 511. Rivets 2002 protrude into the interior of the drawer. The jelly ice packs 1401 include loops 2001. Each loop 2001 fits over a rivet 2002.

Figure 22:
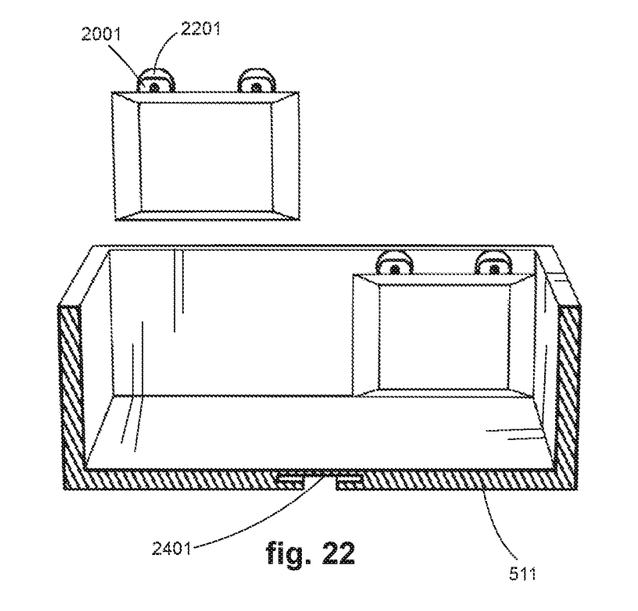
FIG. 22 shows a bin drawer with jelly ice packs held in place by a system of loops and suction cups.
Figure 23:
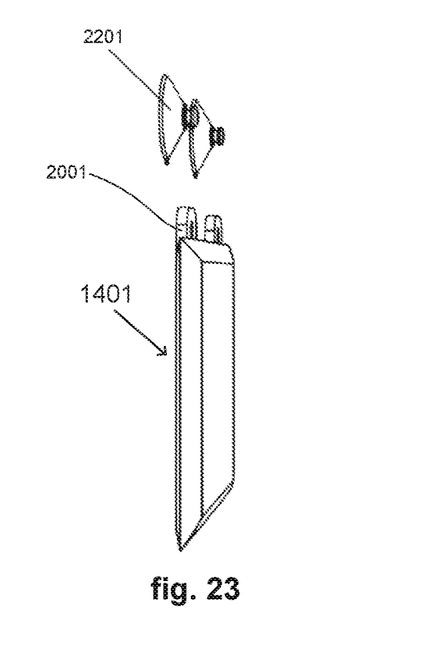
FIG. 23 shows the loops and suction cups from FIG. 22 in greater detail.

In FIGS. 22 and 23, the loops 2001 of each jelly pack 1401 fit over suction cups 2201. Instead of rivets, the suction cups are applied to the interior walls of the drawer 511 to hold the jelly ice packs in place.

Figure 24:
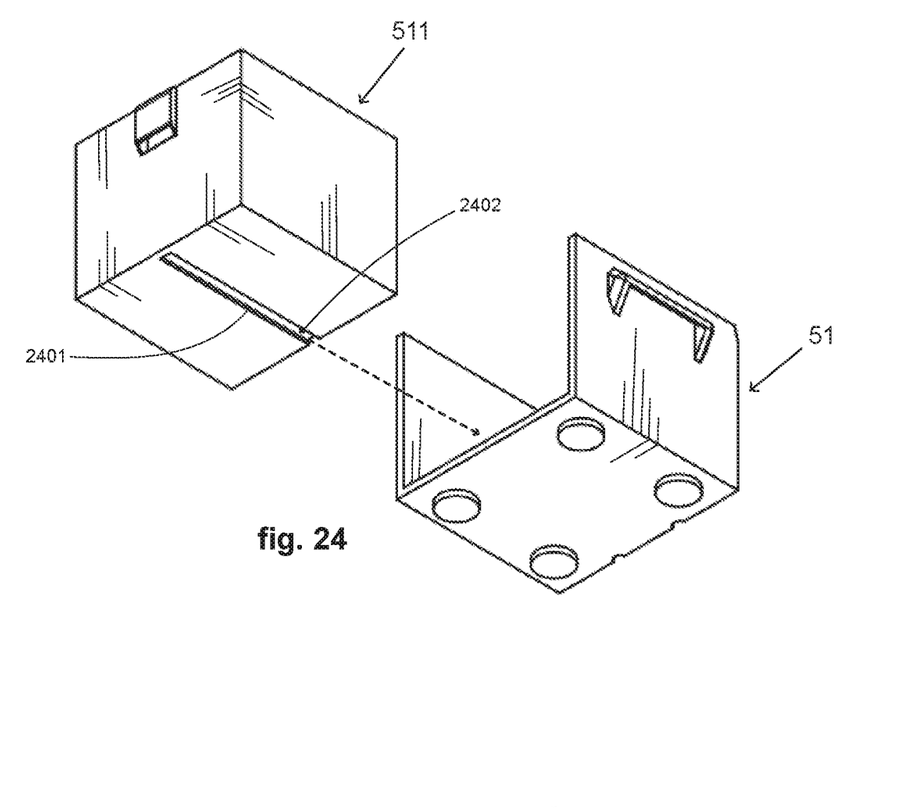
FIG. 24 shows the underside of a bin and drawer, and the mechanism that secures the drawer in the bin. The dashed arrow indicates the direction of motion of the drawer into the bin.
Figure 25:
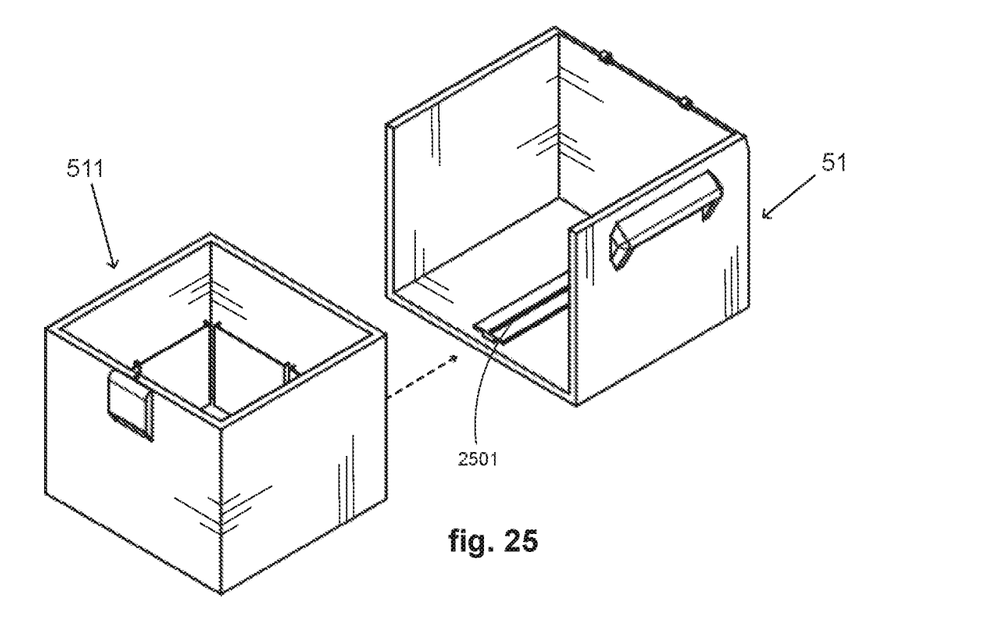
FIG. 25 shows the upper side of a bin and drawer, and the mechanism that secures the drawer in the bin. The dashed arrow indicates the direction of motion of the drawer into the bin.

FIGS. 24 and 25 show the mechanism that holds each drawer securely in its bin. A modular bin is used for demonstration here; the main bin utilizes the same system. A groove 2401 in the underside of drawer 511 fits over a rail 2501 on the floor of bin 51. A stopper 2402 is situated at the rear of the groove. The stopper prevents the drawer from coming completely out of the bin.

FIGS. 26 and 27 show the location and construction of a locking mechanism, which keeps each drawer closed and airtight. The main bin is used for demonstration. The modular bins also use this mechanism. FIG. 26 is a cutaway left-plan view of the main bin 11 and its drawer 111. The locking mechanism 2601 is situated at the top of the front face of the drawer. The locking mechanism utilizes an indentation 2701 in the bin 11 and a depression 2702 in the drawer. The depression 2702 houses a spring 2703, which exerts upward force on a ball 2704. When the drawer is closed, the spring pushes the ball firmly into the indentation 2701, thus locking the drawer. In a preferred embodiment, the indentation 2701 and ball 2704 are made of ferromagnetic materials to create a particularly strong magnetic seal.

The drawer includes a latch 2705. The top of the latch forms the shape of a prong 2706. When the latch is pulled, its prong 2706 pushes down on the pin 2704, thus releasing the pin from the indentation 2701 in the bin 11. Now the drawer can open.

In its intended best mode of use, the kit will have two to four bins. Some bins will be more heavily loaded with ice packs for items that require very cold temperatures, such as ice cream. Other bins will use fewer ice packs, for items that should be refrigerated but not frozen, such as drinks. Another bin might use no icepacks at all, for the storage of heat-tolerant items such as napkins or potato chips. The bins will all be stacked atop one another, whether on the main bin of the first embodiment or the dolly of the second embodiment. A small modular bin will be used for fragile items such as eggs or chips. The stacked coolers will be rolled easily to a car, where they can be lifted individually into the trunk. One bin will remain in the back seat. While driving, the users can easily access the bin in the backseat. Once arriving at their destination, they can once again stack the bins atop one another and continue to wheel the cooler around outside. While the coolers are stacked atop one another, they are accessed through the front-opening drawers, as well as the trapdoor on the very top bin. At the end of the day, the users will remove the jelly ice packs and refreeze them for later use. This way, the product does not collect water, so there is no spillage through the front-opening drawers.

I claim:
1. A kit of coolers, comprising
a dolly, comprising
a platform in close proximity to the ground, in the form of a single horizontal plate with inaccessible interior;
at least two wheels attached to the platform;
an extendable handle fixedly attached to the platform and protruding upward from the platform;
and indentations;
at least one bin, each comprising
front, rear, left, right, top, and bottom surfaces;
indentations on the top surface having the same size and shape as the indentations on the platform;
and protrusions on the bottom surface, sized and shaped to fit securely within the indentations of another bin or the platform;
a drawer in each bin, opening from the front surface of the bin.

2. A kit of coolers, comprising
a dolly, comprising
- a platform;
- at least two wheels attached to the platform;
- an extendable handle protruding upward from the platform;
- and indentations;
- said handle having an inward-facing surface and an outward-facing surface;

at least one bin, each comprising
- front, rear, left, right, top, and bottom surfaces;
- indentations on the top surface having the same size and shape as the indentations on the platform;
- protrusions on the bottom surface, sized and shaped to fit securely within the indentations of another bin or the platform;
- and vertical grooves open at the rear surface, sized and shaped to accommodate the inward-facing surface of the extendable handle of the platform;
- and a drawer in each bin, opening from the front surface of the bin.

3. The invention of claim 2, wherein
the platform is in close proximity to the ground and assumes the form of a single horizontal plate with inaccessible interior;
and the extendable handle is fixedly attached to the platform.

4. The invention of claim 3, wherein
each drawer has four vertical surfaces;
at least one drawer further includes at least one jelly ice pack, at least one loop on each jelly ice pack, and at least one rivet attached to a vertical surface of the drawer to fit through a loop on a jelly ice pack.

5. The invention of claim 4, wherein at least one rivet is fixedly attached to a vertical surface of a drawer.

6. The invention of claim 4, wherein at least one rivet comprises a suction cup, and said rivet is attached to a vertical surface of a drawer with said suction cup.

* * * * *